US011102297B1

(12) United States Patent
Tsao

(10) Patent No.: US 11,102,297 B1
(45) Date of Patent: *Aug. 24, 2021

(54) SYSTEM AND METHOD FOR WIRELESS DEVICE ACCESS TO EXTERNAL STORAGE

(71) Applicant: SYNKLOUD TECHNOLOGIES, LLC, Milton, DE (US)

(72) Inventor: Sheng Tai Tsao, Fremont, CA (US)

(*) Notice: Subject to any disclaimer, the term of this patent is extended or adjusted under 35 U.S.C. 154(b) by 100 days.

This patent is subject to a terminal disclaimer.

(21) Appl. No.: 15/992,091

(22) Filed: May 29, 2018

Related U.S. Application Data

(63) Continuation of application No. 14/977,509, filed on Dec. 21, 2015, now Pat. No. 10,015,254, which is a
(Continued)

(51) Int. Cl.
| | |
|---|---|
| *G06F 3/00* | (2006.01) |
| *H04L 29/08* | (2006.01) |
| *G06F 3/06* | (2006.01) |
| *H04N 5/76* | (2006.01) |
| *H04M 1/72403* | (2021.01) |

(52) U.S. Cl.
CPC ........ *H04L 67/1097* (2013.01); *G06F 3/0604* (2013.01); *G06F 3/067* (2013.01); *G06F 3/0643* (2013.01); *H04L 67/06* (2013.01); *H04M 1/72403* (2021.01); *H04N 5/76* (2013.01)

(58) Field of Classification Search
CPC . H04L 67/1097; H04L 41/0806; H04L 67/02; H04L 67/42; G06F 3/067; G06F 16/182; G06F 3/061; G06F 3/0643; G06F 3/0604
See application file for complete search history.

(56) References Cited

U.S. PATENT DOCUMENTS

| | | |
|---|---|---|
| 6,269,394 B1 | 7/2001 | Kenner et al. |
| 6,309,305 B1 | 10/2001 | Kraft |
| (Continued) | | |

FOREIGN PATENT DOCUMENTS

| | | |
|---|---|---|
| CN | 1379939 | 11/2002 |
| CN | 1411183 | 4/2003 |
| (Continued) | | |

OTHER PUBLICATIONS

Decision Granting Institution of Inter Partes Review dated Nov. 4, 2020 in U.S. Pat. No. 10,015,254. (32 Pages).
(Continued)

*Primary Examiner* — Chirag R Patel
(74) *Attorney, Agent, or Firm* — Capitol IP Law Group, PLLC

(57) ABSTRACT

Traditionally, wireless device, such as cell phone or personal data assistant device (PDA), has relatively smaller storage capacity. Therefore, it is quite often that a user of the wireless device has difficulty to find more storage space for storing ever increased personal data, such as storing message, and multiple Gig bytes of multimedia data including digital video, music, or photo picture etc. Instant application disclosed a system and method for a storage system providing storage service to the wireless device for the wireless device remotely storing personal data into an external storage space allocated exclusively to a user of the wireless device by the storage system.

16 Claims, 4 Drawing Sheets

Related U.S. Application Data continuation of application No. 14/036,744, filed on Sep. 25, 2013, now Pat. No. 9,239,686, which is a continuation of application No. 10/726,897, filed on Dec. 4, 2003, now Pat. No. 8,606,880.

(56) References Cited

U.S. PATENT DOCUMENTS

| | | | |
|---|---|---|---|
| 6,442,529 B1 | 8/2002 | Krishan et al. | |
| 6,735,623 B1 | 5/2004 | Prust | |
| 6,754,696 B1 | 6/2004 | Kamath et al. | |
| 7,222,176 B1* | 5/2007 | Laurent | G06F 3/0607 |
| | | | 709/225 |
| 7,266,555 B1 | 9/2007 | Coates et al. | |
| 9,344,235 B1* | 5/2016 | Putra | G06F 3/0608 |
| 2001/0028363 A1 | 10/2001 | Nomoto et al. | |
| 2002/0019908 A1 | 2/2002 | Reuter et al. | |
| 2002/0026558 A1* | 2/2002 | Reuter | G06F 3/0605 |
| | | | 711/114 |
| 2002/0078102 A1 | 6/2002 | Dutta | |
| 2002/0078197 A1 | 6/2002 | Suda et al. | |
| 2002/0091836 A1 | 7/2002 | Moetteli | |
| 2004/0101272 A1* | 5/2004 | Boston | H04N 5/76 |
| | | | 386/295 |
| 2004/0214551 A1 | 10/2004 | Kim | |
| 2004/0215749 A1* | 10/2004 | Tsao | H04L 67/1097 |
| | | | 709/220 |

FOREIGN PATENT DOCUMENTS

| | | |
|---|---|---|
| KR | 2001-0089012 | 9/2001 |
| KR | 2001-0103325 | 11/2001 |
| KR | 2002-0003041 | 1/2002 |
| WO | 01/67233 | 9/2001 |
| WO | 02/052785 | 7/2002 |

OTHER PUBLICATIONS

Decision Granting Institution of Inter Partes Review dated Nov. 4, 2020 in U.S. Pat. No. 10,015,254. (29 Pages).

Decision Granting Institution of Inter Partes Review dated Jan. 25, 2021 in U.S. Pat. No. 10,015,254.

* cited by examiner

Wireless devices supports in a simple environment

SYSTEM AND METHOD FOR WIRELESS DEVICE ACCESS TO EXTERNAL STORAGE

CROSS REFERENCE TO PRIOR APPLICATION

This invention is a continuation application of the U.S. patent application Ser. No. 14/977,509 filed on Dec. 21, 2015 which itself is a continuation application of U.S. patent application Ser. No. 14/036,744 filed on Sep. 25, 2013, now a U.S. Pat. No. 9,239,686 and which itself is continuation application for U.S. patent application Ser. No. 10/726,897 filed on Dec. 4, 2003 and now a U.S. Pat. No. 8,606,880. The application Ser. No. 10/726,897 has also referenced application Ser. No. 10/713,904 of "Concurrent Web Based Multi-task Support for Control Management System", now a U.S. Pat. No. 7,418,702, and referenced application Ser. No. 10/713,905 of "IP Based Distributed Virtual SAN", now a U.S. Pat. No. 7,379,990 in the name of same inventor. All above prior applications and patents are herein incorporated by reference in their entireties for all purpose.

FIELD OF THE INVENTION

This invention relates to wireless devices accessing and using external storage spaces provided by one or more servers that includes a method for a wireless device downloading a file from a remote server into an assigned external storage.

BACKGROUND INFORMATION

Storage system can be categorized as internal storage or external storage system.

The internal storages of a computing system include those storage media such as hard disk drives, memory sticks, memory, and others that are internally connected within the computing system through system bus or a few inches of cable. Therefore, the storage media actually are internal components of the computing system in a same enclosure.

The external storages of a computing system are those storage media that are not the internal components of the computing system in a same enclosure. Therefore, they have to be connected through longer cable, such as through Ethernet cable for IP based storage, Fiber channel cable for fiber channel storage, or wireless communication media, and others. The storage media of the external storage could be magnetic hard disk drives, solid state disk, optical storage drives, or memory card and could be in any form such as Raid which usually consists of a group of hard disk drives.

To effectively use a storage system, the storage devices of the storage system usually need to be partitioned into small volumes. After the partitioning, each of the volumes can be used for establishing a file system on top of it. To simplify the discussion, herein, the term of the storage volume and its corresponding file system, and the term of the storage partition are often used without differentiation in this invention.

CCDSVM in this invention is an abbreviation for a central controlled distributed scalable virtual machine. The CCDSVM allows a control management system to control a group of computing systems for providing distributed services to client systems over the Internet, Intranet, and LAN environment.

By the way, in this invention, the ISP refers to Internet service provider and the ASP refers to application service provider.

Figure 1:
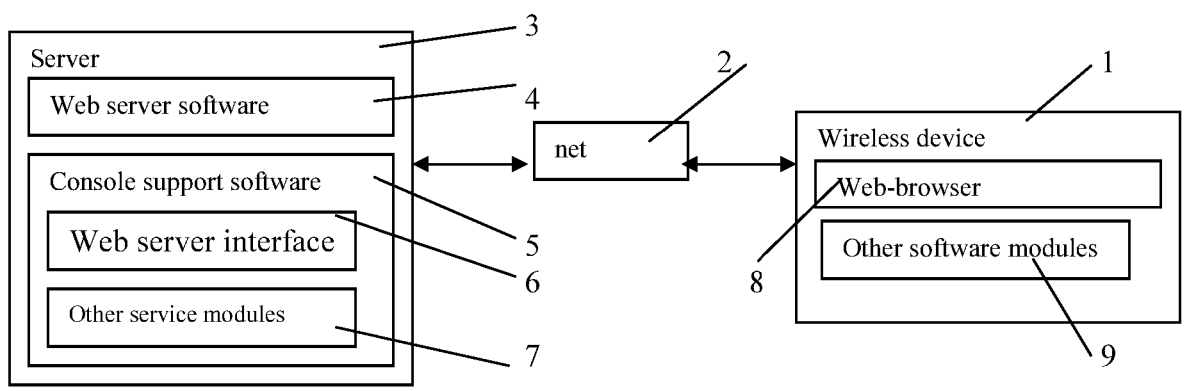
FIG. 1 is a figure the same as a FIG. 1 of a prior application Ser. No. 10/713,904 of the "Concurrent Web Based Multi-task Support for Control Management System" with an exception of renaming a console host of the prior application as wireless device herein.

Unless specified, the programming languages and the protocols used by the software modules, and the computing systems used in this invention are assumed to be the same as described in the prior patent applications.

In addition, in the drawing, like elements are designated by like reference numbers. Further, when a list of identical elements is present, only one element may be given the reference number.

BRIEF DESCRIPTION OF THE INVENTION

Today, users commonly face a problem of lack of storage capacity in their wireless devices such as in their cell phones or personal data assistant devices ("PDA"), which are usually limited to 256 MB for the PDA and much less for the cell phone. To effectively solve this problem and let users possess multiple gigabytes (GB) of storage for their wireless devices as well as allowing the users to use the GB storage for their multimedia applications, the storage on a server can be used as the external storage for the wireless devices. This technology has been briefly introduced in the prior patent applications by the same author.

Figure 2:
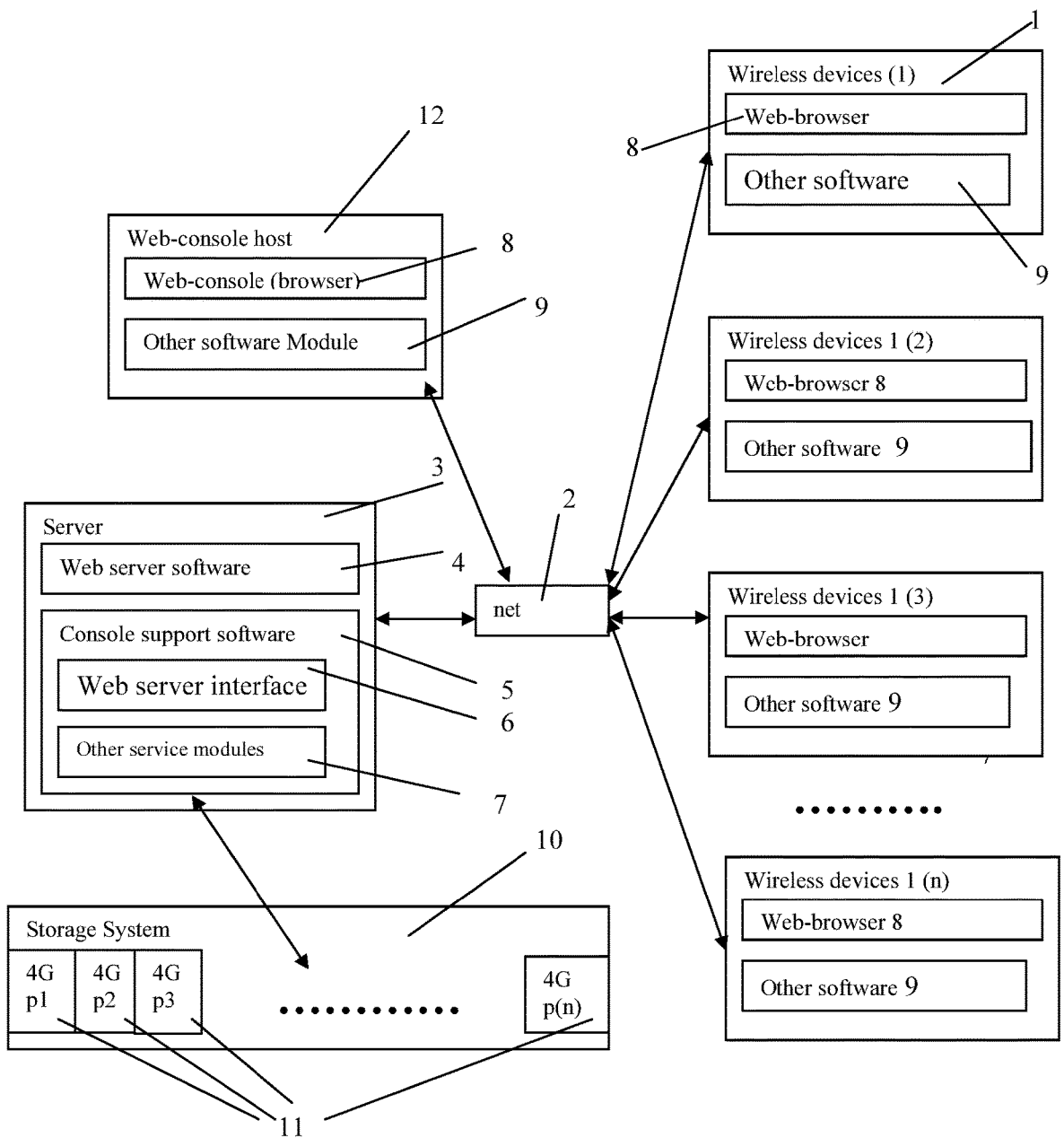
FIG. 2 is a figure the same as the FIG. 1 of this invention with an exception that it shows a more detailed storage system configured and controlled by the server in the FIG. 1 above. In addition, multiple wireless devices are presented in this FIG. 2.
Figure 3:
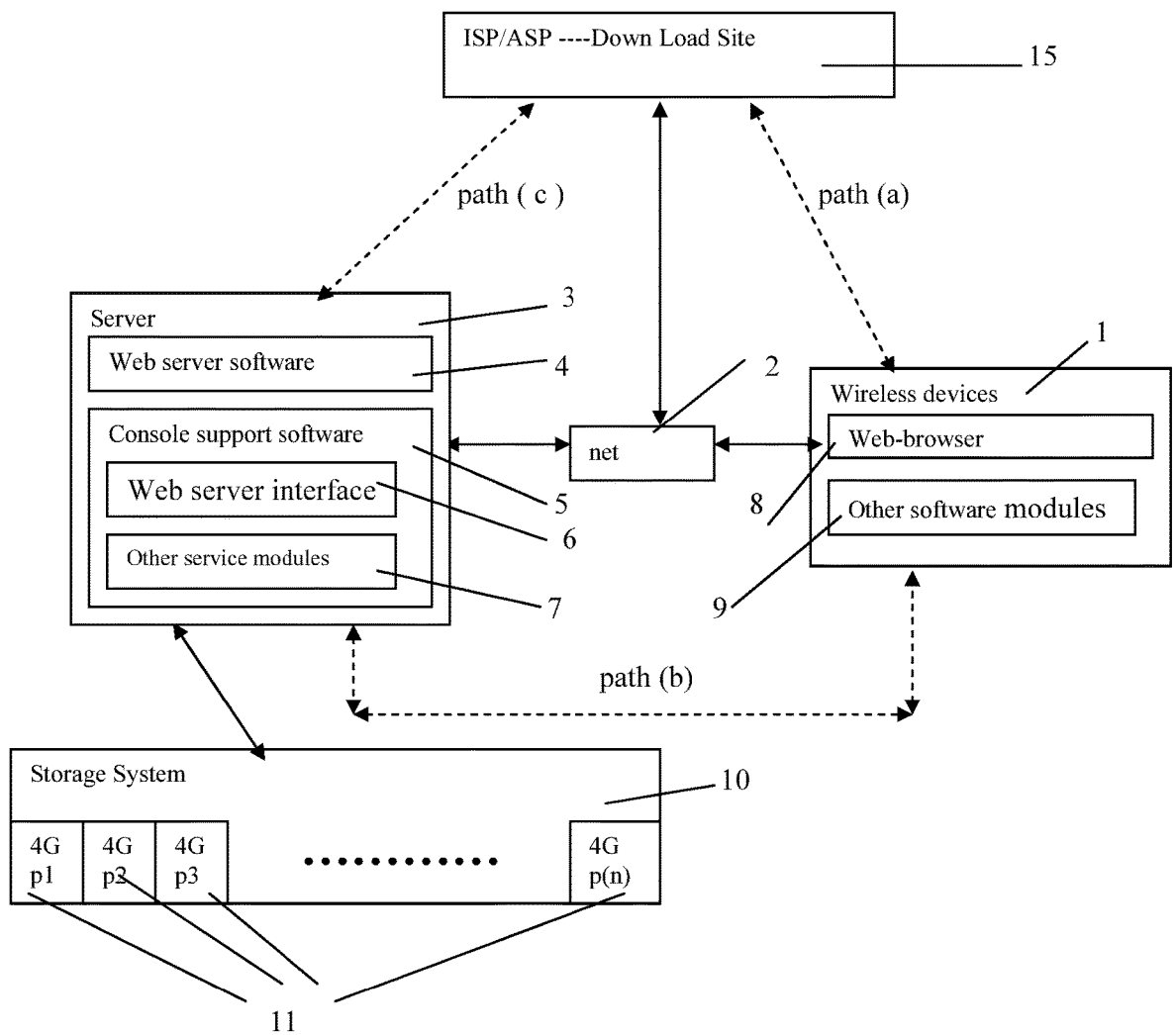
FIG. 3 shows a scheme of a wireless device downloading data (contents) from an ISP/ASP or from other web sites to an external storage of the wireless device.

The followings describe details on how can the external storage actually be used by the wireless devices by referring to the FIG. 2. First, let each server unit 3 (e.g. the server 3 of the FIG. 2) partition its storage system in such way that each of volumes will have multiple GB in size. Therefore, a user of any one of the wireless devices can exclusively be assigned for access to a specific storage volume on the server unit 3. For example, if we need to provide each user a 4 GB storage space, then a 160 GB disk drive can support 40 users. Therefore, a 4096 GB storage system on the server unit 3 can support a total of 1024 users. Further, any data on the wireless device can be transmitted to the assigned storage volume on the server unit. In addition, the user on the wireless device also can download multimedia data from an ISP or ASP to the assigned storage volume of the designated server unit 3 through out-band approach as shown in FIG. 3. Finally, the user can use a web-browser, which has a functionality of invoking embedded video or music, to enjoy his/her stored multimedia contents.

These and other features, aspects and advantages of the present invention will become understood with reference to the following description, appended claims, and accompanying figures.

DETAILED DESCRIPTION OF THE DRAWINGS

Referring now to the FIG. 1, this figure demonstrates a network connection between a wireless device and a server, where, Net (2) represents a communication link, which may be combined with wireless and wired connection media and guarantee that the communication packets can be sent or received between the wireless device and the server. It is also assumed that the net (2) infrastructure is built up in such way that a user from a web-browser of a wireless device can access and browse any web-site on the Internet, and Intranet.

In the FIG. 1, the console support software (5) on the server (3) can support web-based multitasking while a user using a web-browser (8) of a wireless device (1). Further, the user on the web-browser (8) is facilitated to perform creating structured layered file directories or folders, and perform data management operations, such as delete, move, copy, rename for data files or folders or directories residing on an assigned storage volume of the server (3).

In addition, the other software modules (9) of the wireless device (1) is also configured capable to send data to or receive data from the other service modules (7) of the server (3) via communication link (2) through a suitable IP or non-IP based protocol. The data being sent or received could be a digital photo picture, a message and other data.

In addition, the console supporting software (5) of the server (3) and the other software modules (9) of the wireless device (1) can be implemented with suitable languages such as C, C++, Java, and others.

Besides, the web-browser (8) of the wireless device (1) can be any suitable software tool, which. is capable to communication with web server software (4) on the server (3) or with other web server through the HTTP protocol.

The FIG. 2 has demonstrated how can the storages of a server (3) be assigned to multiple wireless devices for being used as their external storage as follows:

First, the storage system (10) of the server (3) can be partitioned into multiple volumes (11), for example, by administration staff through a web-console (13) of a console host (12).

Second, the storage system (10) of the server (3) can be partitioned in such way that each of the wireless devices can be assigned with a storage volume of a desired size, which can be best supported by the server (3) for supporting maximum numbers of the wireless devices.

In addition, the storage connection media could be any kind such as SCSI cable, IP cable, Fiber cable and others. Meanwhile the storage system itself could be various types.

Finally, the storage system (10) can be accessed by each of the wireless devices through IP or non-IP based network and protocols.

The FIG. 3 has demonstrated that a user from a web-browser (8) on a wireless device (1) can download data from a known web-site (15) to his/her assigned external storage (10) on the server (3). The dash-lined path (a) represents a communication link between the wireless device (1) and the remote web-site (15), which provides contents for web download. The dash-lined path (b) represents a communication link between the wireless devices (1) and the storage server (3). The dash-lined path (c) represents a communication link between the server 3 and the remote web-server (15), which provides download contents.

THE DETAILED DESCRIPTION OF THE INVENTION

The Use of the External Storage of the Wireless Device:

The FIG. 2 shows a simplified diagram illustrating the wireless devices (1) using and accessing the external storage system (10) of a server (3), for effectively solving the storage limitation problem of the wireless devices (1).

Partition Storage Volumes (Refer to the FIG. 2):

With this invention, the entire storage (10) on a server (3) needs to be partitioned into suitable size of volumes (11) such as 4 GB for each volume for allowing the server 3 to serve maximum number of the wireless devices (1). With the web console support software (5) of the server (3), the task of partitioning the storage system (10) can be done through a web-console (13) on a console host (12) by an administrative staff.

In order to support storage partition, first the console support software (5) of the server (3) must send storage information of the server (3), such as the information of the storage system (10), to the web-console (13) of the console host (12). The storage information includes each storage device name, storage size and others. Second, based on the storage information received, the administration staff on the console host (12) can use the web-console (13) to fill out partition information for the storage devices and send the storage partition information to the console support software (5) of the server (3). The storage partition information includes the number of the partitions (volumes) and the size of each partition (volume). Third, upon receiving the storage partition information from the web-console (13) of the console host (12), the console support software (5) of the server (3) performs the actual storage partition by dividing the entire storage into multiple small volumes. Finally, for each small storage volume, a corresponding file system could be built up.

Assign Storage Volumes (Refer to the FIG. 2):

Each of the storage volumes (11) together with its corresponding file system (11) on the storage system (10) of the server (3) needs to be exclusively assigned and exported to a given specific wireless device (1) by the console support software (5) of the server (3).

Data and Storage Volume Management (Refer to FIG. 2)

With the support of the console support software modules (5) of the server (3), a user on a web-browser (8) of the wireless device (1) can setup folder or directory structure on the file system of his/her assigned external storage volume (11). In addition, the user on the web-browser (8) of the wireless device (1) can performing all data management operations such as delete, copy, move, or rename and other operations for files or folders on that file system.

In order to support such data management over the external storage (10) by using the web browser (8) of the wireless device (1), first the console support software modules (5) of the server system (3) must communicate with the web-browser (8) of the wireless device (1) for presenting the external storage to a user on the wireless device. Therefore, the user from the web-browser (8) of the wireless device (1) can choose desired data management operation and submit the operation for the wireless device sending the operation information to the console support software modules (5) of the server system (3). These operations include establishing folder or directory, and copying, moving, or renaming data file and others for the folder or directory. Second, upon receiving each data management operations, the console support software modules (5) of the server system (3) actually performs the operations over the assigned file system of the assigned external storage volume (11) on the server system (3).

Store Data from Wireless Device into External Storage (Refer to FIG. 2):

To store the data such as digital photo pictures or messages into the assigned file system on the external storage (11) of a server (3), the other software modules (9) of the wireless device (1) need to send the data to the other service modules (7) of the server (3) via communication link between them. Upon receiving the data, the other service modules (7) of the server (3) write these data to the assigned file system of the assigned storage volume (11) on the server (3). The protocol used between these two communication entities could be either IP or non-IP based protocol.

Download Data from a Remote Web Server Site into External Storage (Refer to the FIG. 3):

If a user of a wireless device (1) wants to download data from a remote web server (15) into an assigned file system (11) of the assigned external storage on a server (3), the following steps are required:

1) Provide the user from a web-browser (8) of the wireless device (1) access to a remote web server site (15) to obtain information for the downloading via the path (a) of the FIG. 3. For example, to provide the use via the web browser obtains a web-page, which contains IP address of the remote web site and the data name for the downloading.

2) The other software modules (9) of the wireless device (1) obtains the downloading information, which becomes available in the cached web-pages on the wireless device (1) after the web-browser (8) accessing the web site (15).

3) The other software modules (9) of the wireless device (1) send the obtained downloading information to other service modules (7) of the storage server (3) via the path (b).

4) Upon receiving the downloading information from the wireless device (1), the other service module (7) of the storage server (3) sends a web download request to the web-site (15) via the path (c) based on download information obtained and then receives the downloading data from the web server of the web-site (15).

5) Upon receiving downloading data, the other service modules (7) of the storage server (3) write the data for the wireless device (1) into the assigned file system (11) on the server (3).

Retrieve Data from External Storage of a Wireless Device:

1) If a web-browser (8) has embedded video or music functionality, the web-browser (8) of a wireless device (1) can be used to retrieve and play multimedia data file such as video or music stored in the wireless device's external storage volume (11), which actually located on a server (3).

2) If there is needs, the other software module (9) of the wireless device (1) also can retrieve data file from the assigned file system of the assigned storage volume (11) on a server (3).

Figure 4:
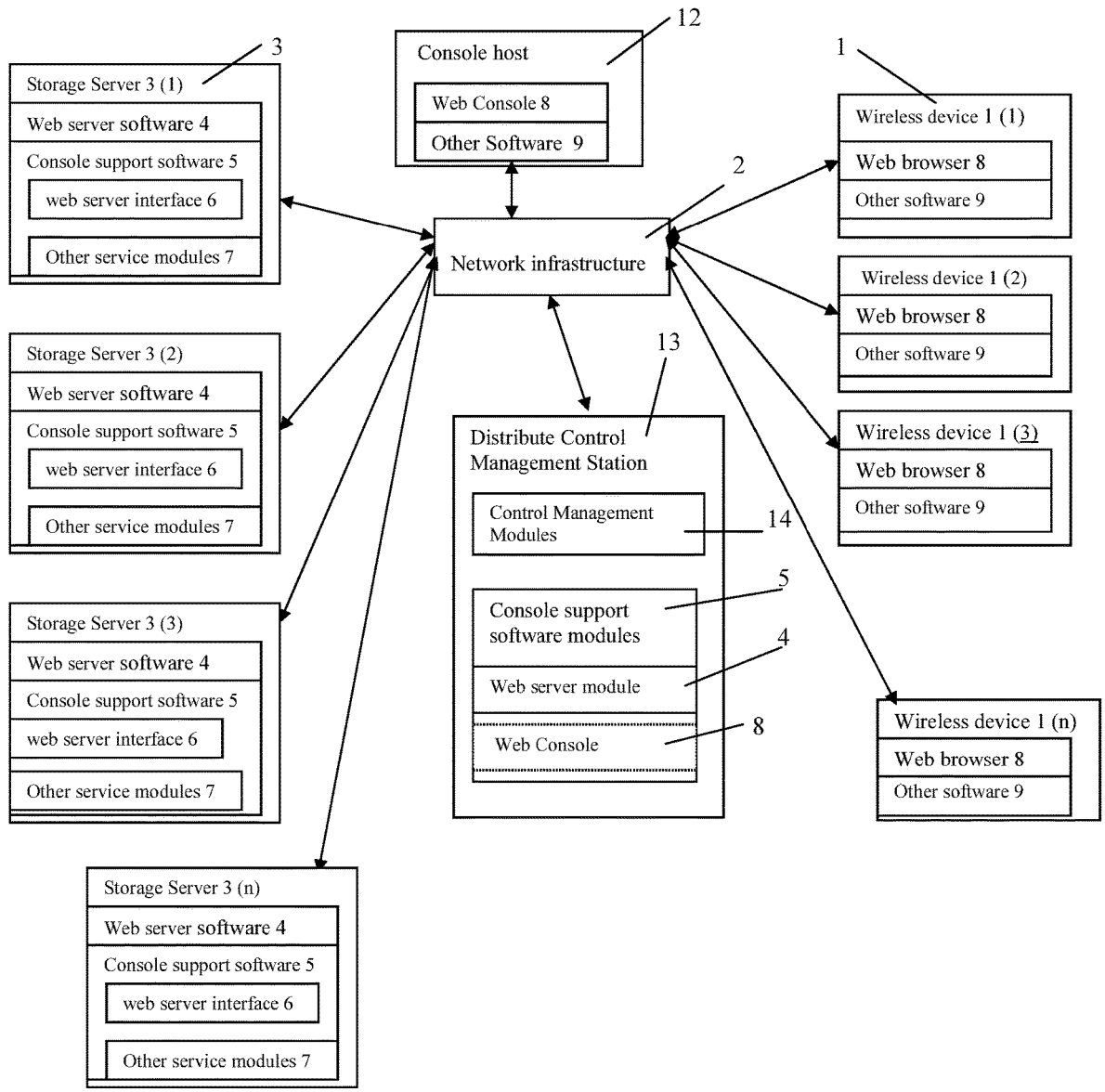
FIG. 4 is a figure the same as a FIG. 1 of the prior application Ser. No. 10/713,905 of "IP Based Distributed Virtual SAN" with an exception that each IP storage server herein provides file system for external storage to each of the wireless devices instead of providing IP based virtual SAN service of the prior application. Also, each host in the FIG. 1 of the prior application has been replaced herein by a wireless device of this invention.

Support External Storage for Large Number of the Wireless Devices:

Referring now to the FIG. 4. If there is a need to provide each user a 2 GB of storage space, then a 160 GB disk drive can support 80 users. A 4096 GB (4 Tera Bytes) storage system on the server unit can support 2024 user. Therefore, a server unit 3 only can efficiently support a limited size of the storage system. In order to support a large number of the wireless devices, such as for supporting 500,000 wireless devices, a larger number of the servers is required, in this case 250 servers is required. In order to let a larger number of the servers to effectively support the larger number of the wireless devices, an infrastructure like the CCDSVM is desirable, which has been described in the prior patent applications. With the CCDSVM the control management system can control larger number of storage servers to provide external storage for a huge number of the wireless devices.

The invention claimed is:

1. A method for facilitating external storage to wireless devices, comprising: provisioning automatically a plurality of storage servers to form a storage volume pool,
   wherein each of the storage servers is configured with a plurality of storage devices, and the storage volume pool comprising a plurality of storage volumes, each of the storage volumes comprising at least information of starting address and size of the each of the storage volumes;
   configuring a web user interface and causing display of the web user interface, including display of the storage volume pool on a console device;
   assigning a first one of the storage volumes to a user of a first one of the wireless devices for the user thereof exclusively accessing the first one of the storage volumes, and
   presenting the first one of the storage volumes on the first one of the wireless devices via a wireless link;
   updating the first one of the storage volumes in response to the user from the first one of the wireless devices performing each of tasks of accessing the first one of the storage volumes, said tasks including a task of downloading a file from a remote web server across a network into the first one of the storage volumes.

2. The method of claim 1, wherein the storage devices on each of the storage servers are partitioned with one or more storage volumes through a web console by an administrator, and each storage volume is a logic storage unit configured by using one or more storage devices.

3. The method of claim 2, wherein said provisioning automatically comprises executing a storage volume pool automatic construction protocol between a control server and each of the storage servers for each storage server automatically sending information of the one or more storage volumes to the control server for automatically forming the storage volume pool.

4. The method of claim 3, wherein and the storage volume pool is represented by an information list and status of the storage volume pool can be dynamically display and monitored by the control server.

5. The method of claim 4, wherein the status of the storage volume pool comprises total size of the storage volume pool, each storage volume's assignment information, and online status of each of the storage servers.

6. The method of claim 1, wherein said downloading a file from a remote web server comprises: obtaining by the first one of the wireless devices information for the file from the remote web site, sending the information cached on the first one of the wireless devices to one of the storage servers serving the first one of the storage volumes to cause the one of the storage server downloading the file from the remote web server into the first one of the storage volumes.

7. The method of claim 1, wherein said tasks comprises from the first one of the wireless devices storing electronic data, including message or video or music or picture to or retrieving the electronic data from the first one of the storage volumes.

8. The method of claim 7, wherein said tasks comprises from the first one of the wireless devices create one or more folder structure for said storing electronic data.

9. The method of claim 7, further comprising: assign a second one of the storage volumes to a user of the second one of the wireless devices for the user thereof exclusively accessing the second one of the storage volumes, and
presenting the second one of the storage volumes on the second one of the wireless devices via a wireless link.

10. A control server for facilitating external storage to wireless devices, comprising:
at least one network connection medium and one computer-readable storage device comprising program code that, when executed by the control server, configures the control server to facilitate external storage to wireless devices through a network infrastructure that include to
provision automatically the storage servers to form a storage volume pool, wherein each of the storage servers is configured with a plurality of storage devices, and the storage volume pool comprising a plurality of storage volumes, each of the storage volumes comprising at least information of starting address and size of the each of the storage volumes;
configure a web user interface and causing display of the web user interface, including display of the storage volume pool on a console device;
assign first one of the storage volumes to a user of a first one of the wireless devices for the user thereof exclusively accessing the first one of the storage volumes; and
authorize the first one of the wireless devices directly accessing the first one of the storage volume independent of the control server;
wherein the first one of the wireless devices directly accessing the first one of the storage volume comprises downloading a file from a remote web server across a network into the first one of the storage volumes.

11. The control server of claim 10, wherein the storage devices on each of the storage servers are partitioned with one or more storage volumes through a web console by an administrator, and each storage volume is a logic storage unit configured by using one or more storage devices.

12. The control server of claim 11, wherein said provisioning automatically comprises executing a storage volume pool automatic construction protocol between a control server and each of the storage servers for each storage server automatically sending information of the one or more storage volumes to the control server for automatically forming the storage volume pool.

13. The control server of claim 12, wherein and the storage volume pool is represented by an information list and status of the storage volume pool can be dynamically display and monitored by the control server.

14. The control server of claim 13, wherein the status of the storage volume pool comprises total size of the storage volume pool, each storage volume's assignment information, and online status of each of the storage servers.

15. The control server of claim 10, wherein said downloading a file from a remote web server comprises: obtaining by the first one of the wireless devices information for the file from the remote web site, sending the information cached on the first one of the wireless devices to one of the storage servers serving the first one of the storage volumes to cause the one of the storage servers downloading the file from the remote web server into the first one of the storage volumes.

16. A method for facilitating external storage to wireless devices, comprising: provisioning automatically among a plurality of users of the wireless devices a plurality of storage servers to form a storage volume pool,
wherein each of the storage servers is configured with a plurality of storage devices, and the storage volume pool comprising a plurality of storage volumes;
configuring a web user interface and causing display of the web user interface;
assigning a first one of the storage volumes to a user of a first one of the wireless devices for the user thereof exclusively accessing the first one of the storage volumes, and
presenting the first one of the storage volumes on the first one of the wireless devices via a wireless link;
updating the first one of the storage volumes in response to the user from the first one of the wireless devices performing each of tasks of accessing the first one of the storage volumes, said tasks including a task of downloading a file from a remote web server across a network into the first one of the storage volumes.

* * * * *